May 12, 1936. J. MANCINI ET AL 2,040,264
APPARATUS FOR AGING WHISKY OR OTHER ALCOHOLIC BEVERAGES
Filed Jan. 25, 1934
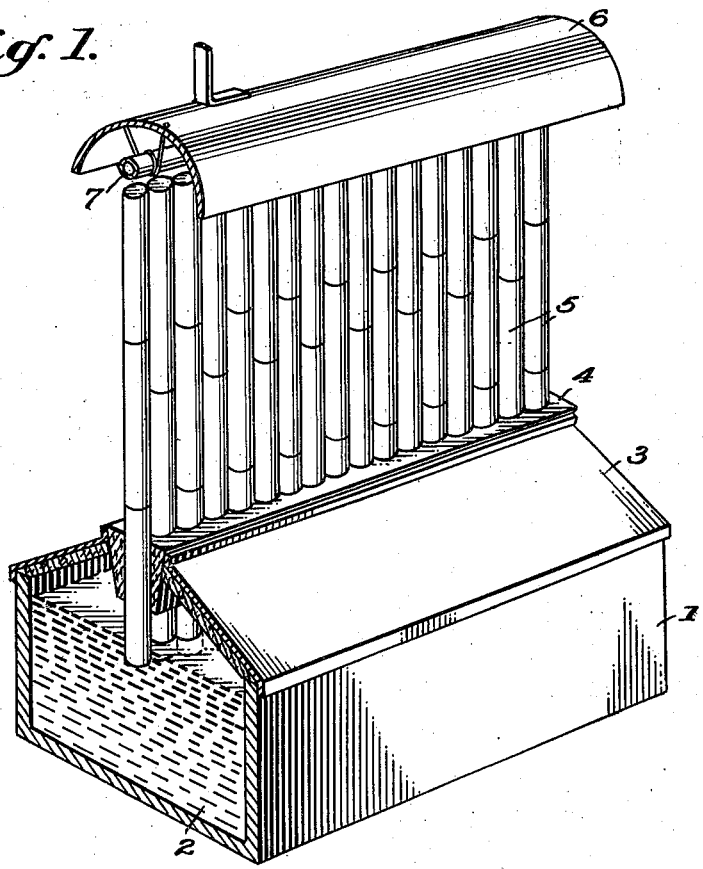
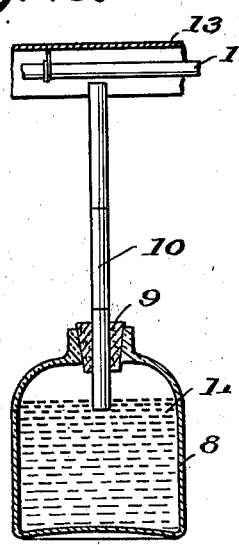
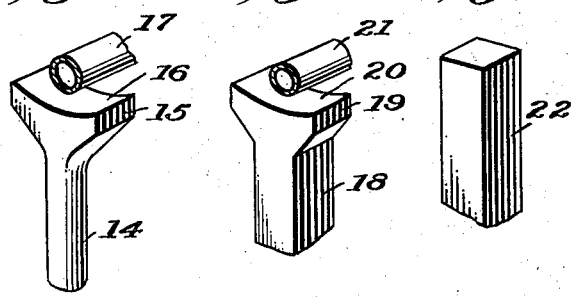
Inventors
John Mancini and
Nicholas Di Archangel
By Milano & Milano
Attorneys Patented May 12, 1936

2,040,264

UNITED STATES PATENT OFFICE 2,040,264

APPARATUS FOR AGING WHISKY OR OTHER ALCOHOLIC BEVERAGES

John Mancini and Nicholas Di Archangel, New York, N. Y.

Application January 25, 1934, Serial No. 708,299

3 Claims. (Cl. 99—277)

Our invention relates to new and useful improvements in a method of and apparatus for aging whisky or other alcoholic beverages and has for its principal object the method of and apparatus for aging whisky or other alcoholic beverages in a much shorter time than is now required by the processes and apparatuses now commonly in use.

A further object of our invention resides in the method of and apparatus for aging whisky or other alcoholic beverages by conducting ultra-violet rays thereto, the ultra-violet rays being conducted directly into the liquid through a quartz rod or rods, the end or ends of the rod or rods being immersed in the liquid for only a relatively short distance.

Another object of the invention consists in positioning the ultra-violet ray tube or burner a substantial distance away from the liquid so that no heat is conducted to the liquid, the quartz rod or rods being in turn positioned relative to the ultra-violet ray tube or burner to present an air gap therebetween thereby preventing any heat from being conducted from the ultra-violet ray tube or burner into the liquid.

With the above and other objects in view, which will appear as the description proceeds, our invention consists in the novel details of construction and arrangement of parts, illustrated in the accompanying drawing and described in the following specification, and while we have illustrated and described the preferred embodiments of the invention, as they now appear to us, it will be understood that such changes may be made as will fall within the scope of the appended claims.

In the drawing:—

Fig. 1 is a perspective with parts broken away.

Fig. 2 is a transverse section, partly in section, and partly in elevation, showing a slightly modified form of the invention.

Figs. 3, 4 and 5 illustrate in perspective modified forms of quartz rods.

In the drawing 1 indicates a vat or container for receiving the whisky or other alcoholic beverages indicated at 2 and the vat or container 1 is provided with the top or cover indicated at 3 and provided with a longitudinally extending opening in which is received an insulator strip 4 provided with vertically extending openings through which the quartz rods 5 extend with their lower ends immersed a short distance into the body of liquid 2. The insulating strip 4 may be of cork, porcelain, or any other desired material, but in the present instance we have illustraed he same as being of cork and have also illustrated the quartz rods 5 as being formed in sections. The quartz rods will be frictionally held within the openings of the insulating strip 4 and, of course, may be adjusted so as to project or immerse their ends the desired distance into the liquid 2. In Fig. 1 of the drawing we have shown the quartz rods as being cylindrical in form.

Supported above the upper ends of the quartz rods, in any suitable manner, is a reflector 6 and beneath which, and slightly spaced above the upper ends of the quartz rods, is an ultra-violet ray tube or burner indicated at 7. As shown this ultra-violet ray tube or burner extends longitudinally beneath the reflector and above the ends of the series or row of quartz rods.

In Fig. 2 of the drawing we have illustrated a slightly modified form of the invention to the extent that the vat or container is shown in the form of a cylindrical container or jug 8 in the opening of which is inserted the insulator 9 of cork, porcelain or other material but preferably, as shown, of cork. The insulator is provided with an opening through which extends a single quartz rod 10, this quartz rod being frictionally held within the insulator and adjustable for regulating the distance that the end of the rod is projected or immersed in the liquid 11. An ultra-violet ray tube or burner is shown at 12 positioned beneath and supported by the reflector 13 and, as shown, the upper end of the quartz rod 10 is spaced a slight distance from the tube or burner 12. In this instance the quartz rod 10 is also illustrated as being cylindrical in form.

In Figs. 3, 4 and 5 we have illustrated quartz rods of slightly different formations than that disclosed in Figs. 1 and 2 of the drawing. In Fig. 3 the rod 14 is shown as of cylindrical form provided with the head portion 15 having the concaved or curved upper surface 16. The ultra-violet ray tube or burner is shown at 17 positioned above and spaced from the enlarged head 15 of the rod 14. In Fig. 4 of the drawing the quartz rod 18 is shown as being square in formation and provided at its upper end with the enlarged head portion 19 having its upper surface concaved or curved as shown at 20. In this Fig. 4 illustration the ultra-violet ray tube or burner is shown at 21 positioned above and spaced from the enlarged head 20. In Fig. 5 of the drawing we have illustrated a quartz rod 22 of square formation without an enlarged head as is shown in Fig. 4 of the drawing.

In aging whisky or other alcoholic beverages various processes and apparatuses have been used and with the use of these processes and apparatuses it has taken several years in which to properly age the beverages. So far as we know it is new with us to age whisky or other alcoholic beverages by ultra-violet rays and more particularly by ultra-violet rays conducted directly into the liquid through a quartz rod or rods. In actual practice we have found that whisky or other alcoholic beverages, by the use of our process or apparatus, may be aged in eight hour's time to obtain the same quality or conditions as beverages previously aged for as long as seven years. By using the quartz rod or rods for conducting the ultra-violet rays directly into the body of liquid the ultra-violet ray tube or burner may be supported a substantial distance above the vat or container so as to prevent any heat from being conducted to the liquid and, as shown and described, the quartz rod or rods are positioned with their upper ends in spaced relation relative to the ultra-violet ray tube or burner so as to provide an air gap thereby preventing any heat being distributed or conducted from the ultra-violet ray tube or burner to the quartz rod or rods. As has been stated, the lower ends of the quartz rod or rods is or are immersed into the body of liquid for only a relatively short distance and through this arrangement the rays projected from the end or ends of the quartz rod or rods are distributed throughout the body of liquid. The use of the ultra-violet rays in our method and apparatus rids the liquor or other beverage of the deleterious matter as is desirous in the aging of whisky or other beverage and the fusel oil and other obnoxious ingredients disappear as such. By the use of our method and apparatus the same results are brought about as would be accomplished if the beverage had been left in a charred barrel for a long period of time or approximately seven years which is the time required in aging whisky or other alcoholic beverages in the usual well-known manner. As previously stated, by the use of our method or apparatus the same results are obtained by aging over a period of only approximately eight hours.

The use of the insulator in the opening or neck of the container or vat prevents the rays from being wasted or absorbed by the container or vat and also prevents any odors entering the container or vat.

We have also found by the use of our method and apparatus that the liquid or beverage is somewhat darkened and that the aroma is improved.

Having fully described our invention what we claim as new and desire to secure by Letters Patent is:—

1. An apparatus for aging whisky or other alcoholic beverages including a closed container for a body of liquid, a longitudinally extending ultra-violet ray tube or burner supported a substantial distance above and outside of the container, and a plurality of quartz rods spaced longitudinally with respect to the tube or burner with their upper ends adjacent thereto but spaced therefrom and their lower ends projecting at spaced points into the container and immersed a short distance into the body of liquid within the container.

2. An apparatus for aging whisky or other alcoholic beverages including a closed container for a body of liquid, a longitudinally extending ultra-violet ray tube or burner supported a substantial distance above and outside of the container, and a quartz rod having its upper end positioned adjacent to but spaced from the ultra-violet ray tube or burner and its lower end projecting into the container and immersed a short distance into the body of liquid within the container.

3. An apparatus for aging whisky or other alcoholic beverages including a closed container for a body of liquid, a longitudinally extending ultra-violet ray tube or burner supported a substantial distance above and outside of the container, and a quartz rod having an enlarged head positioned adjacent to but spaced from the ultra-violet ray tube or burner, the lower end of the rod extending into the container and immersed a short distance into the body of liquid therein.

JOHN MANCINI.
NICHOLAS DI ARCHANGEL.